United States Patent [19]

Cheney

[11] 4,196,222

[45] Apr. 1, 1980

[54] PROCESS FOR THE PREPARATION OF MEAT AND BACON ANALOGUES

[75] Inventor: Earl J. Cheney, Calgary, Canada

[73] Assignee: Burns Foods Limited of Calgary, Alberta Canada, Calgary, Canada

[21] Appl. No.: 844,385

[22] Filed: Oct. 21, 1977

Related U.S. Application Data

[63] Continuation-in-part of Ser. No. 835,819.

[51] Int. Cl.$^2$ ............................................. A23B 4/02
[52] U.S. Cl. ................................. 426/264; 426/265; 426/266; 426/646; 426/656; 426/516; 426/802; 426/104
[58] Field of Search ............... 426/104, 264, 265, 266, 426/532, 646, 656, 516, 802

[56] References Cited

U.S. PATENT DOCUMENTS

| | | | |
|---|---|---|---|
| 3,840,677 | 10/1974 | Leidy et al. | 426/802 X |
| 3,852,487 | 12/1974 | Van Werven et al. | 426/646 X |
| 3,857,986 | 12/1974 | Svendsen | 426/646 X |
| 3,890,451 | 6/1975 | Keszler | 426/264 |
| 4,057,650 | 11/1977 | Keszler | 426/646 X |
| 4,061,789 | 12/1977 | Warren | 426/802 X |

FOREIGN PATENT DOCUMENTS

716536  8/1965  Canada ........................................ 426/646

*Primary Examiner*—Raymond N. Jones
*Assistant Examiner*—Esther M. Kepplinger
*Attorney, Agent, or Firm*—Cushman, Darby & Cushman

[57] ABSTRACT

A bacon analogue and similar multi-phased meat products which can duplicate the texture, appearance and content of natural bacon and other multi-phased meat products is obtained by preparing a comminuted fat component which is treated with a curing pickle and preparing a separate comminuted lean component which may be mixed with optional additives such as flavoring, seasoning and preservatives and thereafter extruding the comminuted fat and lean components through a predetermined forming die to unite the fat and lean components to form a bacon analogue or other such multi-phased meat product. This multi-phased meat analogue may then be placed in pans and heated, smoked and cured and then be cooled, sliced and packaged and thereafter be ultimately used and cooked like natural multi-phased meat products.

32 Claims, 1 Drawing Figure

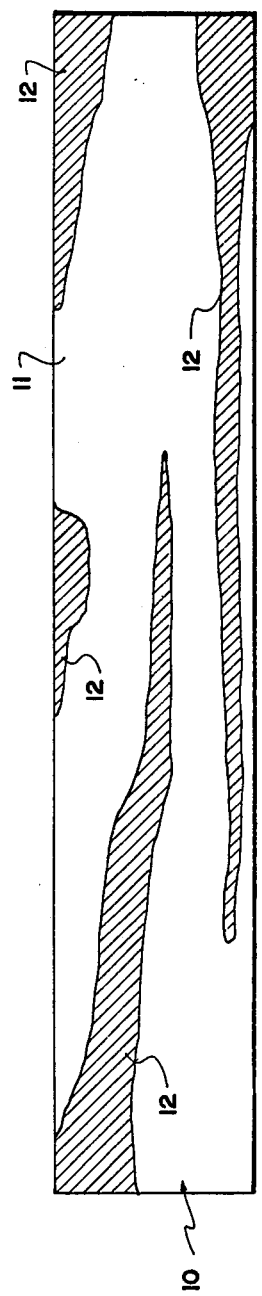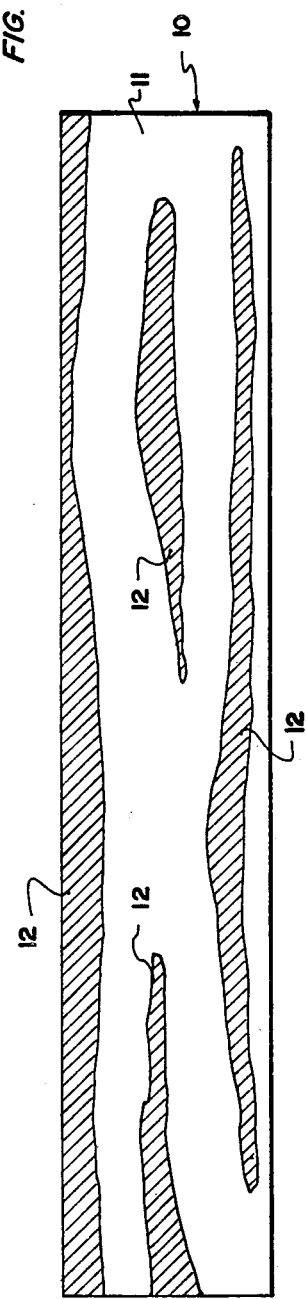

PROCESS FOR THE PREPARATION OF MEAT AND BACON ANALOGUES

BACKGROUND OF THE INVENTION

This application is a continuation-in-part of a U.S. application Ser. No. 835,819 for "Process For The Preparation Of Bacon Analogue And The Like" filed Sept. 22, 1977, now abandoned.

FIELD OF THE INVENTION

This invention relates to a new bacon analogue and similar multi-phased meat products and a novel process for forming the bacon anlogue and related multi-phased meat products of the invention. More particularly, a bacon analogue formed in accordance with the invention exhibits the texture, appearance and taste of natural bacon while maintaining the lean and fat boundary cohesion and integrity when fried or otherwise cooked like bacon obtained from pork bellies.

DESCRIPTION OF THE PRIOR ART

Sausage meat type products have been available which were formed in a slab and sliced in a shape similar to the conventional bacon slices but which do not duplicate the appearance or texture of natural bacon. Various vegetable protein compositions have been developed and marketed which simulate the texture and taste of the bacon strip but which generally have not duplicated the shape or have exhibited phase separation when fried or otherwise prepared as natural bacon. These meat-like preparations utilizing vegetable proteins have required various binders to maintain the integrity of the lean and non-lean portions of a bacon-like product.

However, such products are not composed of real meat and it is obvious from the looks and taste of these products that they are not bacon and that they do not resemble bacon except in some cases, for the size and shape of the slice.

It has long been a goal of the meat processing industry to produce a bacon analogue which will duplicate the appearance, taste and handling characteristics of natural bacon but which can be formed from natural meat products alone or in conjunction with other protein sources to yield bacon from products other than pork bellies and which can maintain a consistent lean to fat ratio. The bacon analogue produced should further exhibit a phase-boundary integrity similar to natural bacon and be able to thereafter be processed, cured, cooked and used in the same manner as conventional bacon.

SUMMARY OF THE INVENTION

The present invention obviates the limitations and disadvantages of prior art simulated products by providing a bacon slab analogue composed of natural meat cuts from pork, beef, fish and other protein sources that can be processed, packaged and thereafter used in the same manner as conventional bacon while exhibiting an appearance, taste and texture similar to natural bacon. More particularly, the novel bacon and other multi-phased meat products formed in accordance with the process of the present invention maintain the lean and fat phase-boundary consistency when fried and cooked in the manner ordinarily employed for natural meat products. In addition to maintaining the advantages of the natural meat product, the bacon analogue of the present invention may further be improved upon by compounding the bacon analogue in a predetermined fat to lean mixture and texture and otherwise specifically formulating it to both reduce and control the ratio of vegetable fat to animal fat and protein content of the bacon analogue.

Another aspect of the invention consists of the process of forming the bacon analogue and similar multiphased meat products which consists of the steps of preparing a comminuted fat appearing mixture of beef, pork, lamb, poultry, fish and other such natural meats or vegetable protein or a combination of one or more of the foregoing and a comminuted lean appearing mixture of beef, pork, lamb, poultry, fish and other such natural meats or vegetable protein or a combination of one or more of the foregoing, passing the fat appearing mixture under pressure through a die and extruding the lean appearing mixture under pressure at preselected locations within said die to simulate the orientation of fat and lean components of a natural bacon slab, and processing the resultant slab.

The advantages of the present invention include the formation of bacon and meat analogues prepared from real meat which when utilized in the process of the present invention can be formulated to duplicate the appearance, texture, consistency and, of course, the taste of the natural meats. The processing of the raw meat mixtures and particularly the fat component increases the natural binding ability of the novel product which exhibits an excellent binding of the layers and is hence, capable of being cooked, fried, sliced and otherwise processed in the same manner as corresponding cuts of meat obtained from natural sources.

Another aspect of the invention is the ability to utilize conventional curing, seasoning and preserving materials for the mixture.

An object of the invention is to provide a process which produces a bacon analogue in which the proportion of lean meat to fat can be controlled as desired.

Another object of the invention is to provide a process in which a portion of beef, pork, lamb, poultry, fish and other such natural meats or vegetable protein which can be, if desired, incorporated with the pork products normally utilized and which may be used to control, the flavor, texture, and within limits the animal to vegetable oil and fat content and cost characteristics of the bacon analogue.

A further object of the invention is to provide a process which enables other portions of the animal to be utilized in the manufacture of a product which is similar to natural bacon.

A further object of the invention is to provide a process which is economical in production and provides a protein rich bacon analogue which maintains the texture, taste and consistency of bacon after cooking.

Other such objects and advantages of the present invention will become apparent to those skilled in the art from the specification in conjunction with the appended drawings which illustrate a slice of the novel bacon analogue of the present invention.

DESCRIPTION OF THE DRAWINGS

FIG. 1 is a front elevational view depicting one arrangement of fat to lean meat for a slice of the bacon analogue produced in accordance with the invention; and FIG. 2 is a front elevational view of a slice of the bacon analogue produced according to the invention depicting an alternative arrangement of fat and lean meats.

In the drawings like characters of reference indicated corresponding parts in FIGS. 1 and 2.

DETAILED DESCRIPTION

Referring now to FIG. 1, reference character 10 illustrates a bacon slice analogue of substantially rectangular configuration having a portion 11 formed from a comminuted fat mixture and having areas of lean meat 12 formed therein, said areas of lean meat being formed from a comminuted lean meat mixture. Similarly, in FIG. 2 an alternative configuration is depicted of a lean meat portion 12 in relation to the comminuted fat mixture portion 11 obtained by modification of the configuration of the extrusion die.

It will be immediately recognized and understood by those skilled in the art that the areas of lean appearing meat may be varied as to size, quantity and shape as desired and other phase or lean to fat striations are contemplated by the invention not only for bacon but other multi-phased meat products, all of which are within the scope of the present invention.

In the preferred embodiment of the invention a bacon analogue is prepared by extruding a comminuted fat meat component or mixture treated with a curing pickle and a comminuted lean meat mixture which by employing the novel extrusion process of the invention, produces a meat slab resembling a pork belly having fat and lean layers as indicated by reference characters 11 and 12 as heretofore discussed. As will be recognized by those skilled in the art, the advantages of the present invention are not dependent upon vegetable and dairy binders or other agents to maintain the phase cohesion but rather upon the extrusion and curing processes of the present invention.

The novel bacon analogue and its respective fat and lean phases or layers is formulated from comminuted fat and comminuted lean mixtures prepared from pork, beef, lamb, poultry, fish and other such natural meats or vegetable protein or mixtures thereof.

In the specification and claims of the invention it will be understood that the terms "fat", "fat mixture", "fat appearing mixture" or "fat component" includes pure fat or meats with a high fat content or a mixture of various meats and fats which is in an uncooked and/or cured condition prior to thermal treatment. "Lean", "lean component", "lean mixture", "lean appearing mixture" or "lean meat" is a mixture of predominantly lean meat with or without fat addition and also in an uncooked and/or cured condition prior to thermal treatment. Furthermore, these terms are relative to one another such that the fat mixture is richer in fat content in proportion to the lean mixture. In this regard, it should be noted that the fat and lean components can be formed from any meat such as pork, beef, lamb, poultry, fish and other such natural meats and combined, within limits, with a vegetable protein or mixture thereof to yield extrudable comminuted fat and lean components. The percent by weight limitation of vegetable protein to natural meat in the comminuted fat component is about 25% by weight to 75% by weight and in the lean component, the natural vegetable protein may be exclusively employed with the preferred range being about 1% to 75% by weight vegetable protein to 99% to 25% by weight natural meat protein by weight. It will of course be recognized by those skilled in the art that with increased proportions of vegetable proteins, additional flavoring, coloring and other such additives are employed.

While various meats such as beef, poultry and fish may advantageously be employed including parts of the pork animal in the preparation of a bacon analogue in accordance with the invention, it has been found that 80% by weight lean boneless pork butts provides the preferred ingredient for the lean meat component and pork jowls and back fat mixture of about 70% by weight jowls to 30% by weight back fat produces a preferable fat meat mixture. In the preferred application of the invention the pork is fresh or a combination of fresh pork with a limit of 30% by weight frozen or 50% by weight defrosted pork which is utilized in the fat meat comminuted component.

The fat component which has generally already been ground is mixed and treated with a curing pickle in a conventional mixer. The curing pickle applied to the comminuted fat may contain spices and other optional ingredients which may, of course, be varied depending upon the desired taste and appearance of the final product. The essential ingredients of the curing pickle are salt and a coloring agent and bacteriostat such as sodium nitrite. One such suitable curing pickle generally employed which is not to be considered limiting, may be composed of approximately the following:

7%–8% by weight of salt;
5%–6% by weight of sugar;
0.5% by weight of sodium erythorbate;
0.1%–0.2% by weight of soluble spices;
0.05% sodium nitrite Maximum protein extraction may be accomplished during the mixing step if the temperature of the mix is maintained reasonably high enough to perform this task but not too high to create smearing. The preferred time of protein extraction is about 15 minutes when a temperature of about 45° F. to 50° F. is utilized for the mixing step and curing pickle treatment of the fat meats. One skilled in the art will recognize that the time and temperature is interdependent and that the higher the fat content in the fat component the longer and/or higher the extraction temperature and times which, of course, is limited by the smearing property of the fat component.

This temperature and time parameter is particularly important since the pickle cure of the fat meat component is believed to remove salt soluble proteins which then act as the natural binding agents of the meat tissues. As heretofore discussed the present invention achieves its advantages of multi-phase and layer integrity without the addition or necessity of vegetable and dairy binding agents. The natural binding of the proteins in the layers of the fat and lean components result from the extrusion process as will hereinafter be described and the process of treating the proteins with the pickle cure.

After mixing and treatment with the curing pickle the comminuted fat meat mixture is transferred from the mixer to a vacuum silent cutter which is conventional in operation. The temperature of the fat meat components is taken and the amount of dry ice is calculated and added in an amount necessary to provide an extrudable mixture while the silent cutter is slowly rotating thereby yielding a fairly stiff emulsion. Typically the reduction of temperature to provide an extrudable mixture is in the range of about 34° F. to 40° F. which assists in the process by maintaining the integrity of the salt soluble protein bind. This temperature range of course varies with the precise fat content of the components but is recognized by those skilled in the art as the temperature at which a fat emulsion exhibits the tendency to create smearing.

Once the temperature of about 34° F. to 40° F. is attained, the interior is placed under a vacuum and the silent cutter is speeded up to chop the meats to a fine emulsion. As heretofore discussed, the lowering of the temperature and its maintenance at that level is important to prevent further breakdown of proteins that in conjunction with the novel extrusion process assist in the binding action of the pickle treated proteins. As soon as the chopping is complete, a further period of time under vacuum is allowed while the silent cutter blades are stopped, to ensure that all carbon dioxide, air and other gases have escaped from the emulsion. The vacuum is released and the fat meats are now ready for the extrusion step. If the fat meats are not being extruded immediately, they should be stored in a cooler so that they can maintain the fairly stiff emulsion desired for the extruding step. While higher and lower extrusion temperatures may be employed, the maximun advantages of the present invention are achieved by utilizing an extruding temperature which is kept at a minimum of about 40° F. and a maximum of about 55° F. Although the example for the preparation of the fat appearing meats is for pork other meats such as beef, lamb, poultry, fish and vegetable protein may be substituted in all or part, with only slight modification to the procedure.

As heretofore discussed, the basic formula for the lean meats is beef, pork, lamb, poultry, fish and other such meats and vegetable protein, or mixtures thereof. Optionally, other ingredients or similar ingredients as were introduced to the fat meat component, may be introduced into the comminuted lean mixture including but not limited to water, salt, cane or beet sugar, monosodium glutamate, liquid smoke, spices, erythorbic acid and sodium nitrite. The lean meats are mixed with the selected optional ingredients and comminuted in a manner similar to the fat component except a silent cutter is generally not necessary and the lean meat component is placed in a vacuum blender or mixer. Thereafter the air and other gases are released and the temperature adjusted to form an extrudable fluid which is generally in the range of about 40° F. to 55° F. It should be noted that during the mixing step of the lean meats, the temperature of the mix must be high enough to keep the lean meats rather soft relative to the fat meats so as to produce a suitable pattern during extrusion for if the lean meats are too cold, they will not extrude properly. Similar to the process with respect to the fat mixture, if the lean meats are not being extruded immediately, they should be kept at a temperature close to the temperature they were at the time of mixing. In the foregoing discussion for the preparation of the lean appearing meats from a pork source, beef, lamb, poultry, fish and other such meats or vegetable protein may be substituted in all or part, with only slight modification to the procedure.

The lean meats and fat meats mixtures are placed in separate hoppers in an extrusion machine, and extruded through dies of a desired fat-to-lean configuration for the final product. It will be recognized by those skilled in the art that the fat and lean hoppers should be kept filled at all times during extrusion and that the die parts should be kept clean. Optimum results are achieved in the present invention when the pump pressure on the fat mixture is maintained at a slightly higher pressure than the lean pump pressure. Generally, these pressure differentials are modified to accomodate the extrudability of the respective fat and lean components and are range from about 1 to 10 psi. The two mixtures are extruded through a die and past mold heads to be extruded in a ribbon-like strip with the lean and fat meat mixtures being layered in shapes similar to that illustrated in the drawings and as they leave the extruding die head. The ribbon of layered mixture is placed in pans shaped to form a uniform slab after heat processing. Slabs that may be used in this process are similar to those illustrated and described in Canadian patent application Ser. No. 267,282.

The extruded bacon analogue is then placed in pans and loaded onto conventional conveying equipment and are placed into a batch or continuous type smokehouse in a manner which is well known to those skilled in the art. The product is then conveniently and optionally smoked in a conventional manner and heat processed at a schedule of increasing temperatures until an internal temperature of between 148° F. and 156° F. is reached with the ideal temperature being 150° F. The slabs are then removed from the pans and cooled to a temperature ideal for slicing the slab into strips similar to bacon.

When using pork, poultry, fish or vegetable protein for the lean meats the curing of the mixtures should be from 1 to 3 days depending upon the ingredients of the mixtures. No curing period is required when beef is used in the lean meat mixture.

The following examples are for the purpose of further illustrating the preparation of the novel product and process of the invention and in the following examples all percentages are by weight.

EXAMPLE 1

In this Example, 51% by weight pork jowls along with 23% by weight pork back fat was employed as the fat meat component along with 8% salt, 6% sugar, 0.5% sodium erythorbate, 0.4% monosodium glutamate, 0.2% liquid smoke to prepare a comminuted pickle fat component with the remaining percent water all of the foregoing proportional percentages being by weight. First, the meat was ground through a fine plate in a conventional grinder along with the above ingredients which compose the curing pickle. The resulting mass is mixed for approximately 15 minutes at a temperature of 50° F. The resulting mixture was transferred to a silent cutter and dry ice was added to drop the temperature to 34° F. and chopped for a period of two minutes. The resultant fat component in the form of an emulsion at a temperature of 40° F. is removed from the cutter and is ready for extrusion.

EXAMPLE 2

In this Example, beef, 66% by weight boneless carcass beef, is ground through a fine plate into a mixture of 10% by weight fat meats as prepared in Example I. To this mixture was added the following ingredients all of which are expressed in percents by weight, 8% salt, 6% sugar, 0.5% sodium erythorbate, 0.4% monosodium glutamate, 0.2% liquid smoke to prepare a comminuted lean component. The meat and ingredients are ground and mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 3

In this Example the fat meat component of Example 1 was extruded with the lean meat component of Example 2. During the extrusion process, the lean meat is at a temperature of 50° F. with the same pressure at the beginning of the extrusion process. The resulting ribbon-like slab is inspected for the desired lean to fat configuration of the resulting product and the pressure adjusted to maintain this fat lean ratio. The resulting slab is cured, smoked and thereafter sliced and fried to yield a delicious bacon slice that did not separate upon fry-out.

EXAMPLE 4

In this Example, 51% by weight pork jowls along with 23% by weight pork back fat was employed as the fat meat component along with 8% salt, 6% sugar, 0.5% sodium erythorbate, 0.4% monosodium glutamate, 0.2% liquid smoke to prepare a comminuted pickle fat component with the remaining percent water, all of the foregoing proportional percentages being by weight. First, the meat was ground through a fine plate in a conventional grinder along with the above ingredients which compose the curing pickle. The resulting mass is mixed for approximately 15 minutes at a temperature of 50° F. The resulting mixture was transferred to a silent cutter and dry ice was added to drop the temperature to 34° F. and chopped for a period of 2 minutes. The resultant fat component in the form of an emulsion at a temperature of 40° F. is removed from the cutter and is ready for extrusion.

EXAMPLE 5

In this Example pork butts trimmed to 80% lean are combined with 8% salt, 6% sugar, 0.5% sodium erythorbate, 0.4% monosodium glutamate, 0.2% liquid smoke to prepare a comminuted lean component. The meat and ingredients are ground and mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 6

In this Example the fat meat component of Example 4 was extruded with the lean meat component of Example 2. During the extrusion process, the lean meat is at a temperature of 50° F. with the same pressure at the beginning of the extrusion process. The resulting ribbon-like slab is inspected for the desired lean to fat configuration of the resulting product and the pressure adjusted to maintain this fat lean ratio. The resulting slab is cured, smoked and thereafter sliced and fried to yield a delicious bacon slice that did not separate upon fry-out.

EXAMPLE 7

In this Example, 50% by weight ham fat was combined with 22% picnic trimmings and 3% soya concentrate. First, the meat was ground through a fine plate in a conventional grinder along with 8% salt, 6% sugar, 0.5% sodium erythorbate, 0.4% monosodium glutamate, 0.2% liquid smoke with water which constitutes the remaining percent to form a curing pickle. The resulting mass is mixed for approximately 15 minutes at a temperature of 50° F. The resulting mixture was transferred to a silent cutter and dry ice was added to drop the temperature to 34° F. and chopped for a period of 2 minutes. The resultant fat component in the form of an emulsion at a temperature of 40° F. is removed from the cutter and is ready for extrusion.

EXAMPLE 8

In this Example, beef, 66% by weight boneless carcass beef, is ground through a fine plate into a mixture of 10% by weight fat meats as prepared in Example 1. To this mixture was added the following ingredients all of which are expressed in percents by weight, 8% salt, 6% sugar, 0.5% sodium erythorbate, 0.4% monosodium glutamate, 0.2% liquid smoke to prepare a comminuted lean component. The meat and ingredients are ground and mixed 2 minutes on and 2 minutes off for a period of 10 minutes under a vacuum. The vacuum is removed and the resultant mass is mixed sufficiently to obtain a satisfactory bind but not over mixed to produce too tight a bind. The resulting mixture is at about 52° F. and is ready for extrusion.

EXAMPLE 9

In this Example the fat meat component of Example 1 was extruded with the lean meat component of Example 2. During the extrusion process, the lean meat is at a temperature of 50° F. with the same pressure at the beginning of the extrusion process. The resulting ribbon-like slab is inspected for the desired lean to fat configuration of the resulting product and the pressure adjusted to maintain this fat lean ratio. The resulting bacon product had more delicate bacon flavor and less fry-out and had maintained the layer striation integrity.

While the comminuted lean pork and beef and vegetable mixtures have been described by way of example, it will be recognized that lamb, poultry, fish and other such meats can be used as either the lean meat component or fat component. After processing the bacon slab analogue, it has been found that between 24° F. and 28° F. is a convenient temperature for the slicing and enables the slices to be consistent and also they can be handled readily and easily. The slices have an uncooked appearance remarkably close to bacon and are consistent in terms of percentage lean to percentage fat and in the distribution of the lean throughout the slice.

Liquid smoke may be used in the mixture to produce a bacon analogue flavor which is equivalent to bacon when cooked and the fry-out is substantially less than bacon and the fried appearance substantially better inasmuch as the slice does not twist or curl but fries flat probably due to the higher lean content.

The invention has been discussed with particular reference to bacon analogues formed by the process of the invention utilizing novel conditions to insure cohesion of the layers in the same manner as in natural bacon before and after cooking. For example, it will be recognized by those skilled in the art that the present invention may be modified to produce other similar multi-phased meats such as corned beef, back bacon and other such multi-phased meats in the application of the invention. It will be further appreciated that substitutions and modifications may be made in the process by those skilled in the art without departing from the scope of the invention. Consequently, these and various other modifications and substitutions may be made within the spirit and scope of the invention as defined in the following claims.

What I claim as my invention is:

1. A process for producing bacon analogue and other multi-phased meat products comprising:
   (a) preparing a comminuted fat component of edible materials wherein at least one member or mixture thereof is a raw meat selected from the group consisting of pork, beef, lamb, poultry and vegetable protein;
   (b) curing said fat component with a pickle cure composed of a salt solution including a bacteriostat and coloring agent until salt soluble proteins are removed to produce a salt soluble protein bind;
   (c) preparing a comminuted lean meat component wherein at least one member or mixture thereof is a raw meat selected from the group consisting of pork, beef, lamb, poultry and vegetable protein; and
   (d) extruding said fat component in the temperature range of about 40° F. to 55° F. and said lean component at a temperature sufficiently low to provide an extrudable mixture which maintains the integrity of a salt soluble protein bind while separately extruding said fat and lean components under pressure through pre-selected locations within a die to simulate the orientation of fat and lean components of a natural meat slab to produce a resultant meat slab.

2. The process according to claim 1 in which the steps of preparing a comminuted fat component and a comminuted lean component additionally comprises the addition of color, flavor and preservative ingredients to said comminuted fat appearing component prior to extruding said component to form a cohesive meat analogue.

3. The process according to claim 1 further comprising the step of maintaining the temperature of the comminuted fat component at a range of about 45° F. to 50° F. during said pickle cure.

4. The process according to claim 1 further comprising the step of comminuting said fat mixture under a vacuum in a silent cutter at a temperature in the range of about 34° F. to 40° F.

5. The process according to claim 4 which further comprises the step of adding dry ice to said silent cutter to maintain said temperature in the range of about 34° F. to 40° F.

6. The process according to claim 4 which further comprises the step of comminuting said fat mixture for a period of time greater than 15 minutes.

7. The process according to claim 4 which further comprises the step of removing the majority of gases such as air and carbon dioxide, from the fat component prior to extruding same.

8. The process according to claim 1 which further comprises the step of comminuting said lean component in a vacuum mixer.

9. The process according to claim 8 which further comprises the step of comminuting said lean component at a temperature in the range of about 40° F. to 55° F.

10. The process according to claim 9 which further comprises the step of removing the majority of gases such as air and carbon dioxide, from the lean component prior to extruding same.

11. The process according to claim 1 which further comprises the step of maintaining a temperature in the range of about 40° F. to 55° F. during said extrusion of said fat and said lean components.

12. The process according to claim 11 which further comprises maintaining about a 1 to 10 p.s.i. greater pump pressure differential on said fat component than on said lean component during said extrusion.

13. The process according to claim 1 which further comprises maintaining said fat component in a slightly greater consistency than said lean component during said extrusion.

14. The process according to claim 1 wherein said coloring agent and bacteriostat is sodium nitrite.

15. The process according to claim 1 wherein said curing pickle additionally comprises a mixture of water, sugar, sodium erythorbate, spices and sodium nitrite.

16. The process of claim 1 which further comprises the step of adding flavoring, coloring and spices to said lean component.

17. The process according to claim 16 wherein said additives comprise a mixture of water, salt, sugar, sodium erythorbate, spices and sodium nitrite.

18. The process according to claim 1 which additionally comprises the step of curing said slab by passing the slab through a smokehouse and raising the internal temperature of said slab from between 148° F. and 156° F. and then cooling the slab.

19. The process accoding to claim 1 which additionally comprises the step of slicing said resultant meat slab at a temperature of about 24° F. to 28° F.

20. A process for producing a bacon analogue comprising:
   (a) mixing a fat component composed of a raw meat selected from the group consisting of pork, beef, lamb, poultry, fish or a mixture of said raw meat and vegetable protein with said mixture having about 75% by weight raw meat;
   (b) curing and extracting salt soluble proteins from said fat component with a pickle cure comprised of salt, coloring agent and bacteriostat to remove salt soluble proteins and produce a salt soluble protein bind;
   (c) comminuting said fat component in a silent mixer under vacuum at a temperature in the range of about 34° F. to 40° F. to form an extrudable comminuted fat component;
   (d) preparing an extrudable comminuted lean component from a raw meat selected from the group consisting of pork, beef, lamb, poultry, fish or a mixture of said raw meat and vegetable protein in a vacuum mixer wherein said lean meat component contains lower fat content in comparison to said fat component;
   (e) extruding said extrudable comminuted fat component at a temperature in the range of about 40° F. to 45° F. and said extrudable comminuted lean component at a temperature in the range of about 40° F. to 55° F. through preselected locations within a die to simulate the orientation of fat and lean components of a natural bacon slab to produce a resultant meat slab.

21. The process according to claim 20 wherein said extrudable lean component is a mixture in the range of about 1 to 75% by weight vegetable protein to 99% to 25% natural meat.

22. The process according to claim 20 wherein said fat component comprises pork meat selected from the group of pork meats consisting of pork jowls and back fat and mixtures thereof.

23. The process according to claim 22 wherein said fat meat component is a pork meat mixture of 70% by weight pork jowls and 30% by weight back fat.

24. The process according to claim 22 wherein said pork meat is fresh pork combined with less than 30% by weight frozen pork.

25. The process according to claim 22 wherein said pork meat is fresh pork combined with less than 50% by weight defrosted pork.

26. The process according to claim 20 wherein said coloring agent and bacteriostat is sodium nitrite.

27. The process according to claim 20 wherein said curing pickle additionally comprises sugar, sodium erythorbate, soluble spices and sodium nitrite.

28. The process according to claim 20 wherein said curing and extraction of said salt soluble proteins with said pickle cure is greater than 15 minutes at a temperature in the range of about 45° F. to 50° F.

29. The process according to claim 20 additionally comprising the addition of dry ice to achieve and maintain said temperature ranges in forming said extrudable fat and lean components.

30. The process according to claim 20 additionally comprising adding water, salt, sugar, monosodium glutamate, liquid smoke, spices, erythorbic acid and sodium nitrite to said lean component.

31. The process according to claim 20 which additionally comprises maintaining the temperature of said fat component in the range of about 40° F. to 45° F. and maintaining said lean component at a slightly higher temperature during extrusion of said fat and lean components.

32. The process according to claim 31 which further comprises maintaining about 1 to 10 p.s.i. great pump pressure on said fat component than on said lean component during said extrusion.

* * * * *